United States Patent
Koo et al.

(10) Patent No.: US 9,954,994 B2
(45) Date of Patent: Apr. 24, 2018

(54) METHOD OF USING EXTERNAL DEVICE ACCORDING TO CONTEXT OF ELECTRONIC DEVICE AND ELECTRONIC DEVICE THEREOF

(71) Applicant: Samsung Electronics Co., Ltd., Gyeonggi-do (KR)

(72) Inventors: Hye-Won Koo, Gyeonggi-do (KR); Young Kyu Seon, Gyeonggi-do (KR); Chaewhan Lim, Daegu (KR); Dong-Ho Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/163,259

(22) Filed: May 24, 2016

(65) Prior Publication Data

US 2016/0381202 A1 Dec. 29, 2016

(30) Foreign Application Priority Data

Jun. 26, 2015 (KR) ........................ 10-2015-0091322

(51) Int. Cl.
*H04M 1/725* (2006.01)
*G06F 11/30* (2006.01)
*G06F 1/16* (2006.01)
*G06F 13/40* (2006.01)

(52) U.S. Cl.
CPC ...... *H04M 1/72533* (2013.01); *G06F 1/1632* (2013.01); *G06F 11/3051* (2013.01); *G06F 13/4081* (2013.01)

(58) Field of Classification Search
CPC ............ G06F 13/4081; G06F 11/3051; G06F 1/1632; H04M 1/72533
See application file for complete search history.

(56) References Cited

U.S. PATENT DOCUMENTS

| | | |
|---|---|---|
| 2014/0075051 A1 | 3/2014 | Zadesky et al. |
| 2014/0237222 A1 | 8/2014 | Bull et al. |

FOREIGN PATENT DOCUMENTS

KR 1020110111828 10/2011

*Primary Examiner* — Lewis West
(74) *Attorney, Agent, or Firm* — The Farrell Law Firm, P.C.

(57) ABSTRACT

Provided are a method and an apparatus including a communication interface, a memory, and a processor. The processor is configured to detect a connection between the electronic device and at least one external device or a docking device, to recognize context information of the electronic device based on an application being executed in the electronic device or a file being accessed, and to control operations of the electronic device and the at least one external device or the docking device based on the context information and the at least one external device.

13 Claims, 13 Drawing Sheets

METHOD OF USING EXTERNAL DEVICE ACCORDING TO CONTEXT OF ELECTRONIC DEVICE AND ELECTRONIC DEVICE THEREOF

PRIORITY

This application claims priority under 35 U.S.C. § 119(a) to Korean Patent Application Serial No. 10-2015-0091322, which was filed in the Korean Intellectual Property Office on Jun. 26, 2015, the entire content of which is incorporated herein by reference.

BACKGROUND

1. Field of the Disclosure

The present disclosure generally relates to a method and apparatus, and more particularly, to a method and apparatus for using an external device according to context of an electronic device.

2. Description of the Related Art

Recently, with the development of digital technologies, various electronic devices including mobile communication electronic devices, personal digital assistants (PDA), electronic organizers, smart phones, tablet personal computers (PC), and the like which may perform communication and process personal information while being carried have come to market. The electronic device has various functions such as a voice call, message transmission like a short message service (SMS)/multimedia message service (MMS), a video call, electronic organizer, photography, email transmission/reception, broadcast reproduction, Internet access, music reproduction, schedule management, social networking service (SNS), messenger, dictionary, gaming, and the like.

Further, the electronic device may perform various functions through various external devices or accessories. For example, the electronic device may be charged when being connected to a charger, and may transmit data to an external device (for example, a display device, a storage device, a printer, and the like) when being connected to the external device.

In the related art, when the electronic device is connected to the external device, only a unique function (for example, charging) of the external device was executed. Recently, a unique ID is assigned to the external device and a function corresponding to the unique ID is stored in advance. Accordingly, when the external device is connected, the preset function corresponding to the unique ID may be performed. However, once the electronic device is connected to the external device, only a preset function may be performed regardless of a use state (for example, context) of the electronic device. That is, there was no method of providing a customized function to the user according to the use state of the electronic device. Further, when one or more external devices are connected to the electronic device, functions of the external devices conflict with each other, so the performance of the function linked with each external device may have a problem.

SUMMARY

In accordance with an aspect of the present disclosure, an electronic device is provided. The electronic device includes a communication interface, a memory, and a processor, wherein the processor is configured to detect a connection between the electronic device and at least one external device, to recognize context information of the electronic device based on an application being executed in the electronic device or a file being accessed, and to control operations of the electronic device and the at least one external device based on the context information and the at least one external device.

In accordance with another aspect of the present disclosure, an electronic device is provided. The electronic device includes a communication interface, a memory, and a processor, wherein the processor is configured to detect a connection of another electronic device and an external device and to control the connection between the other electronic device and the external device.

In accordance with another aspect of the present disclosure, an operation method of an electronic device is provided. The operation method includes detecting a connection between the electronic device and at least one external device, recognizing context information of the electronic device based on an application being executed in the electronic device or a file being accessed, and controlling operations of the electronic device and the at least one external device based on the context information and the at least one external device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
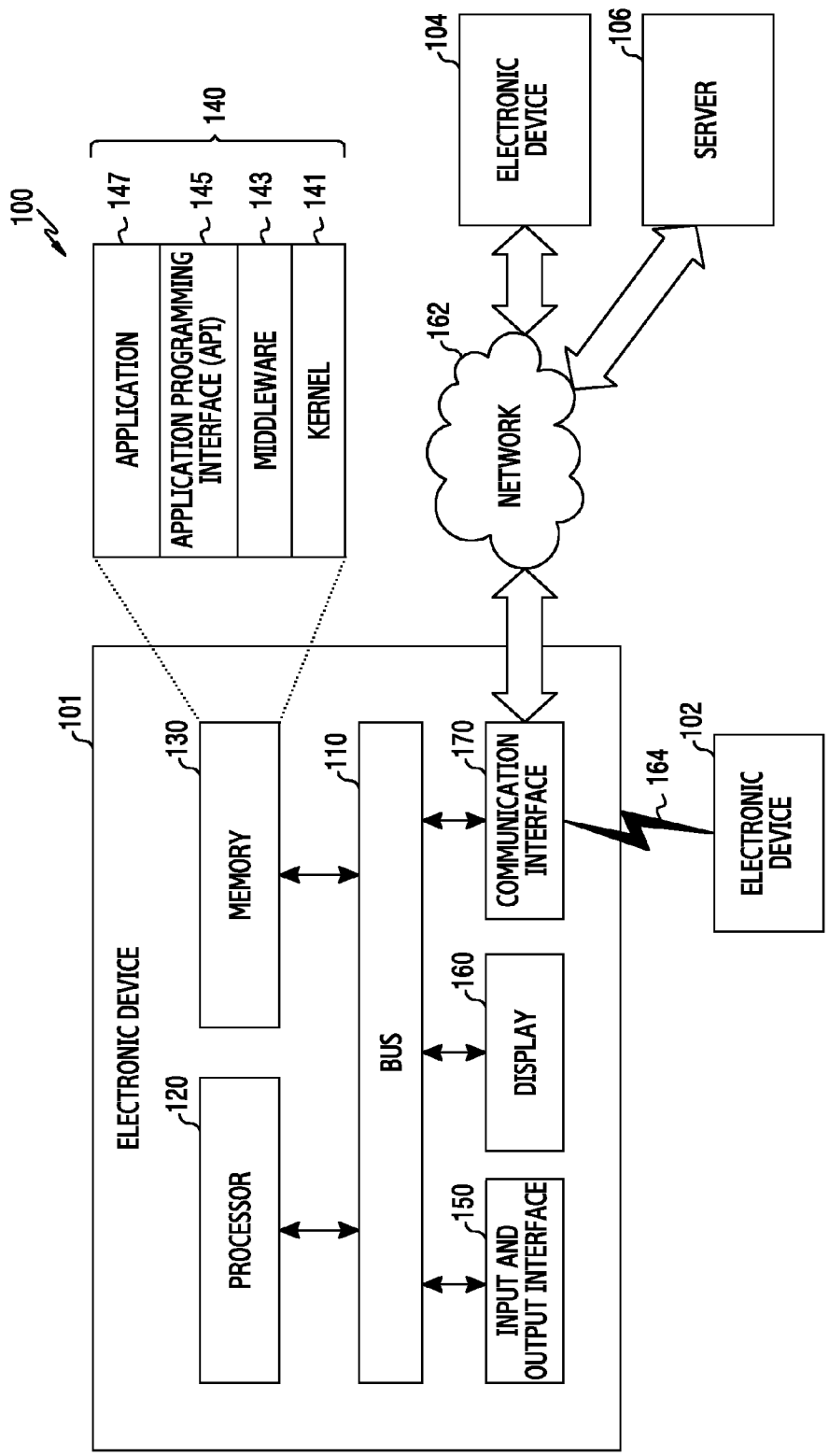
FIG. 1 illustrates an electronic device within a network environment according to various embodiments of the present disclosure.

Hereinafter, various embodiments of the present disclosure will be described with reference to the accompanying drawings. However, it should be understood that there is no limiting the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" include all possible combinations of the items listed. For example, the expressions "A or B", "at least one of A and B", or "at least one of A or B" refer to all of (1) including at least one A, (2) including at least one B, or (3) including all of at least one A and at least one B. The expressions "a first", "a second", "the first", or "the second" used in various embodiments of the present disclosure may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

The terms used in the present disclosure are only used to describe specific embodiments, and do not limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, eyeglasses, contact lens, or a head-mounted device (HMD)), fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller machine (ATM), point of sale (POS) terminal, or Internet of things (IoT) device (e.g., a light bulb, various sensors, electric or gas meter, a sprinkler device, a fire alarm, a thermostat, a streetlamp, a toaster, sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device. Further, the electronic device is not limited to the aforementioned devices, and may include a new electronic device according to the development of new technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 includes a bus 110, a processor 120, a memory 130, an input/output interface 150, a display 160, and a communication interface 170. The electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a central processing unit (CPU), an application processor (AP), and a communication processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 stores software and/or a program 140. The program 140 includes, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, and the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a liquid crystal display (LCD), a light-emitting diode (LED) display, an organic light-emitting diode (OLED) display, a microelectromechanical systems (MEMS) display, and an electronic paper display. The display 160 may display, for example, various types of content (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, long term evolution (LTE), LTE-Advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, Wi-Fi, Bluetooth, near field communication (NFC), and global navigation satellite system (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, and the like. Hereinafter, in the present disclosure, the term "GPS" may be interchangeably used with the term "GNSS". The wired communication may include, for example, at least one of a universal serial bus (USB), a high definition multimedia interface (HDMI), recommended standard 232 (RS-232), and plain old telephone service (POTS). The network 162 may include at least one of a telecommunication network such as a computer network (e.g., a LAN or a WAN), the Internet, and a telephone network.

Each of the first and second external electronic devices 102 and 104 may be of a type identical to, or different from, that of the electronic device 101. According to an embodiment of the present disclosure, the server 106 may include a group of one or more servers. All or some of the operations performed in the electronic device 101 may be executed in another electronic device or a plurality of electronic devices 102, 104 or the server 106. When the electronic device 101 has to perform some functions or services automatically or in response to a request, the electronic device 101 may request another device 102, 104 or the server 106, to execute at least some functions relating thereto instead of, or in addition to, autonomously performing the functions or services. The electronic device 102, 104, or the server 106 may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
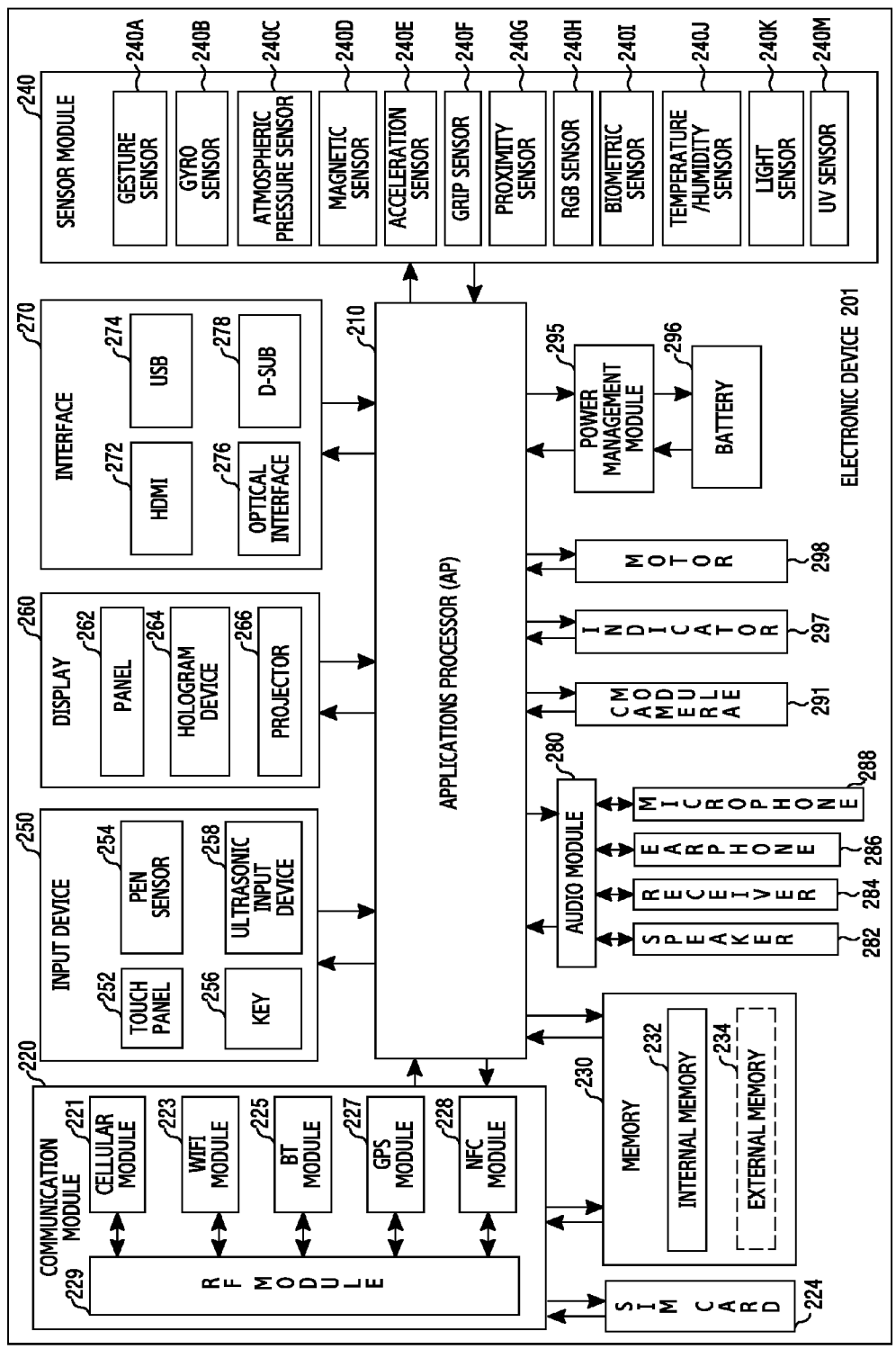
FIG. 2 is a block diagram illustrating a configuration of an electronic device according to various embodiments of the present disclosure.

FIG. 2 is a block diagram of an electronic device according to various embodiments of the present disclosure.

The electronic device 201 may include, for example, all or a part of the electronic device 101 shown in FIG. 1. Referring to FIG. 2, the electronic device 201 includes one or more processors 210 (e.g., application processors (AP)), a communication module 220, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a system on chip (SoC). According to an embodiment of the present disclosure, the processor 210 may further include a graphic processing unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 includes, for example, a cellular module 221, a Wi-Fi module 223, a BT module 225, a GNSS module 227 (e.g., a GPS module 227, a Glonass module, a Beidou module, or a Galileo module), an NFC module 228, and a radio frequency (RF) module 229.

The cellular module 221, for example, may provide a voice call, a video call, a text message service, or an Internet access service through a communication network. According to an embodiment of the present disclosure, the cellular module 221 may distinguish and authenticate the electronic device 201 in a communication network using a subscriber identification module (SIM card) 224. The cellular module 221 may perform at least some of the functions that the AP 210 may provide. The cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one integrated chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including an embedded SIM, and may contain unique identification information (e.g., an integrated circuit card identifier (ICCID)) or subscriber information (e.g., an international mobile subscriber identity (IMSI)).

The memory 230 (e.g., the memory 130) includes, for example, an embedded memory 232 or an external memory 234. The embedded memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable rom (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may further include a flash drive, for example, a compact flash (CF), a secure digital (SD), a micro secure digital (Micro-SD), a mini secure digital (Mini-SD), an eXtreme digital (xD), a multimediacard (MMC), a memory stick, and the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 includes, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a ultra violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris scan sensor, and/or a fingerprint sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 includes, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone 288, ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a d-sub-miniature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media Card (MMC) interface, or an infrared data association (IrDA) standard interface.

The audio module 280, for example, may bidirectionally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an image signal processor (ISP) or a flash (e.g., LED or xenon lamp).

The power management module 295 may manage, for example, power of the electronic device 201. According to an embodiment of the present disclosure, the power management module 295 may include a power management integrated circuit (PMIC), a charger integrated circuit (IC), or a battery gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual charge quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, and the like) of the electronic device 201 or a part (e.g., the processor 210) of the electronic device 201. The motor 298 may convert an electrical signal into a mechanical vibration, and may generate a vibration, a haptic effect, and the like. The electronic device 201 may include a processing device (e.g., a GPU) for supporting a mobile TV. The processing device for supporting a mobile TV may process, for example, media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3:
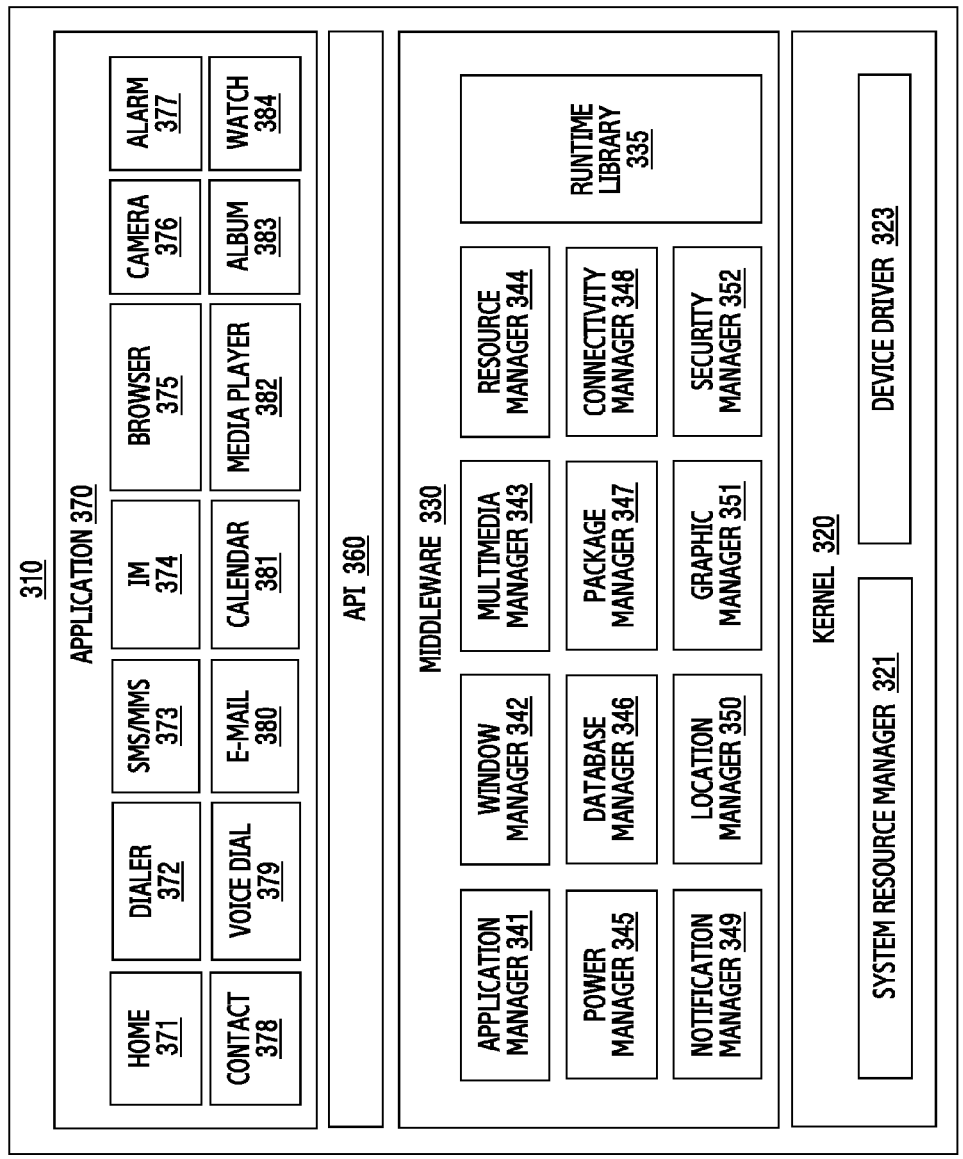
FIG. 3 is a block diagram of a program module according to various embodiments of the present disclosure.

FIG. 3 is a block diagram of a program module according to various embodiments of the present disclosure.

According to an embodiment of the present disclosure, the program module 310 (e.g., the program 140) may include an operating system (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, and the like.

The program module 310 includes a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) includes, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) includes at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, and the like.

The application manager 341 may manage, for example, a life cycle of at least one of the applications 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a basic input/output system (BIOS) and the like to manage a battery or power source and may provide power information and the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, and the like. According to an embodiment of the present disclosure, when the electronic device 101 has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) include, for example, one or more applications which may provide functions such as a home 371, a dialer 372, an SMS/MMS 373, an instant message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar level), or environment information (e.g., providing atmospheric pressure, humidity, or temperature information).

According to an embodiment of the present disclosure, the applications 370 may include an information exchange application that supports exchanging information between the electronic device 101 and an external electronic device 102 or 104. The information exchange application may include, for example, a notification relay application for transferring specific information to an external electronic device or a device management application for managing an external electronic device.

For example, the notification relay application may include a function of transferring, to the external electronic device 102 or 104, notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device 102 or 104 communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance and the like) designated according to attributes of the electronic device 102 or 104. The applications 370 may include an application received from an external electronic device. The applications 370 may include a preloaded application or a third party application that may be downloaded from a server. The names of the components of the program module 310 may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The term "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a non-transitory computer-readable storage medium in a programming module form. The instruction, when executed by a processor (e.g., the processor 120), may cause the one or more processors to execute the function corresponding to the instruction. The non-transitory computer-readable recording media may be, for example, the memory 130.

Figure 4:
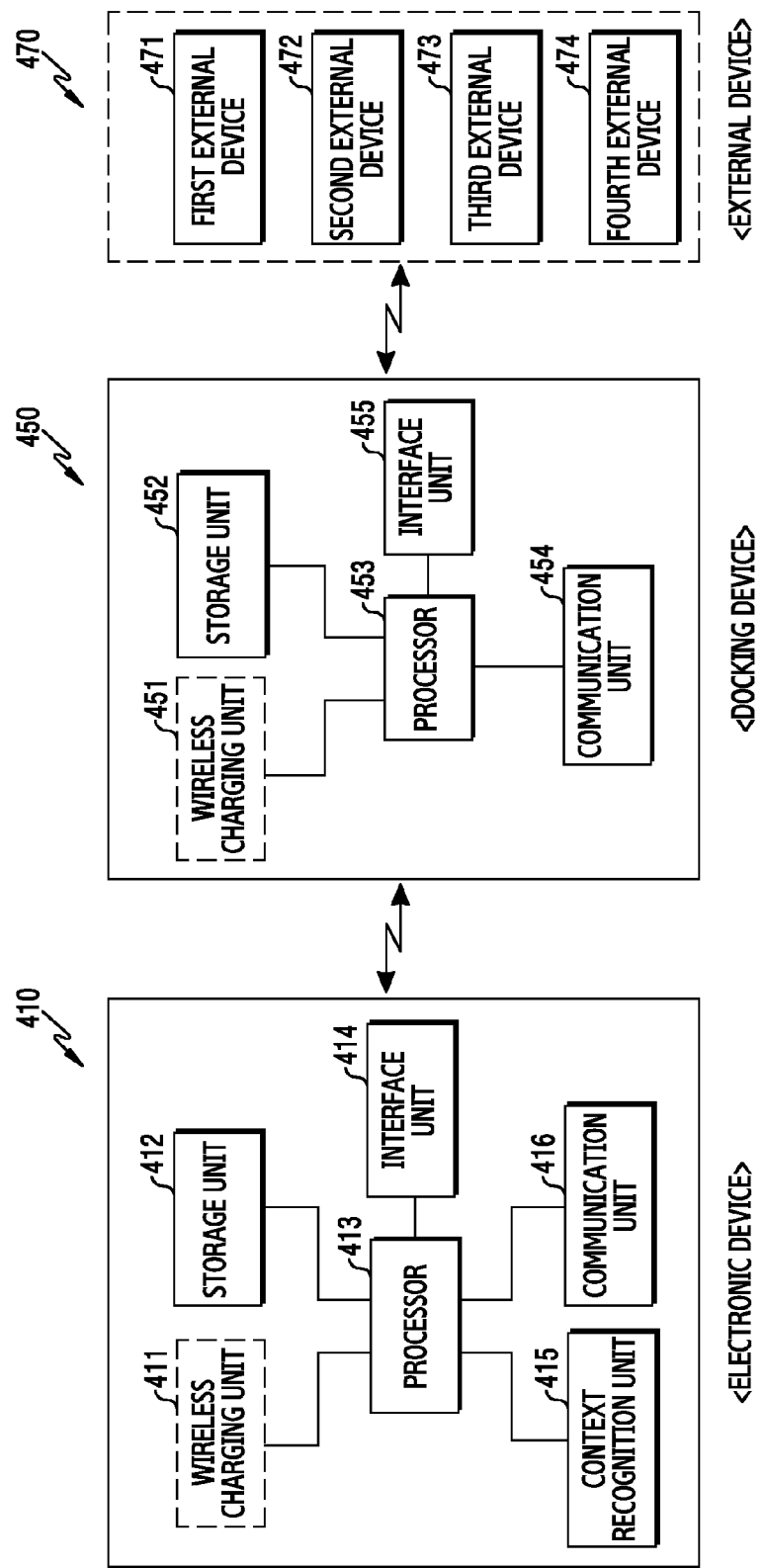
FIG. 4 illustrates a connection relation between an electronic device, a docking device, and an external device according to various embodiments of the present disclosure.

FIG. 4 illustrates a connection relation between an electronic device, a docking device, and an external device according to various embodiments of the present disclosure.

Referring to FIG. 4, an electronic device 410 includes a wireless charging unit 411, a storage unit 412, a processor 413, an interface unit 414, a context recognition unit 415, and a communication unit 416. The electronic device 410 may be the electronic device 101 of FIG. 1 or the electronic device 201 of FIG. 2.

The wireless charging unit 411 may provide a wireless charging function. For example, the wireless charging unit 411 may charge a battery (for example, the battery 296 of FIG. 2) of the electronic device 410 by using a magnetic resonance scheme, a magnetic induction scheme, or an electromagnetic wave scheme. The wireless charging unit 411 may include a circuit for wireless charging, for example, a coil loop, a resonant circuit, a rectifier, and the like.

The storage unit 412 (for example, the memory 130 or the memory 230) may store information (for example, a program or an instruction) required for operating the electronic device 410 and a program for implementing the present disclosure. The storage unit 412 may include one or more of a RAM, ROM, register, flash memory, SSD, hard disk, cloud, SD card, and cache. According to various embodiments, the storage unit 412 may be included in one or more devices related to a smart phone, including a wearable computer, a server, a remote device, an external device, a smart home server, and a cloud service.

The interface unit 414 (for example, the input/output interface 150 or the display 160) may receive an input from a user and output (display) information according to the input. Alternatively, the interface unit 414 may transfer instructions or data received from the user or the external device to other element(s) of the electronic device 410 or output instructions or data received from other element(s) of the electronic device 410 to the user or the external device.

The communication unit 416 (for example, the communication interface 170) may communicate with an external server, a cloud server, and other devices located a short distance away through various communication schemes including long-range communication such as CDMA, GSM, WCDMA, and LTE and short-range communication such as Wi-Fi, Bluetooth, NFC, and UWB. The communication unit 416 may communicate with the docking device 450 and the external device 470 (for example, a first external device 471 to a fourth external device 474) through wireless communication or wired communication.

The context recognition unit 415 may perform a function of recognizing and identifying a state of the electronic device 410, that is, context information. For example, the context information may include at least one of an application being executed in the electronic device 410, information on whether there are contents being executed, measurement information measured by a sensor of the electronic device 410, a time, a date, information on whether the electronic device 410 is connected to another device, and a connection scheme. The context recognition unit 415 may recognize context information of the electronic device 410 and transfer the context information to the processor 413. The context recognition unit 415 may analyze the context information and transfer a result of the analysis to the processor 413, or transfer the collected context information to the processor 413 without any analysis. According to some embodiments, the context recognition unit 415 may be included in the processor 413. That is, the processor 413 may also play the role of the context recognition unit 415.

The processor 413 may carry out calculations or data processing relating to control and/or communication of at least one other element of the electronic device 410. The processor 413 may determine a function based on the context information of the electronic device 410 acquired from the context recognition unit 415 and device information of the external device 470 and perform the determined function.

Further, the docking device 450 may be connected to the external device 470 and serve as a relay for connecting the electronic device 410 and the external device 470. The docking device 450 may include a wireless charging unit 451, a storage unit 452, a processor 453, a communication unit 454, and an interface unit 455. According to some embodiments, the docking device 450 may be the electronic device 101 of FIG. 1 or the electronic device 201 of FIG. 2.

The wireless charging unit 451 may provide a wireless charging function. For example, the wireless charging unit 451 may charge the electronic device 410 in a magnetic resonance scheme, a magnetic induction scheme, or an electromagnetic wave scheme.

The storage unit 452 (for example, the memory 130 or the memory 230) may store information (for example, a program or an instruction) required for operating the docking device 450 and information on the external device 470 connected to the docking device 450.

The processor 453 (for example, the processor 120) may carry out calculations or data processing relating to control and/or communication of at least one other element of the docking device 450. The processor 453 may recognize a connection of the electronic device 410 or the external device 470 and relay data communication between the electronic device 410 and the external device 470.

The communication unit 454 (for example, the communication interface 170) may transmit information associated with the external device 470 (for example, information on the first external device 471 to the fourth external device 474) stored in the storage unit 452 to the electronic device 410 according to a control of the processor 453.

The interface unit 455 (for example, the input/output interface 150 or the display 160) may receive an input from the user and output (display) information according to the input. Alternatively, the interface unit 455 may transfer instructions or data received from the user or the external device (for example, the electronic device 410 or the external device 470) to other element(s) of the docking device 450 or output instructions or data received from other element(s) of the docking device 450 to the user or the external device 470.

The external device 470 may be used while being connected to the electronic device 410. A plurality of external devices 470 may be connected to the docking device 450. According to an embodiment, the external device 470 may be connected to the electronic device 410 through the docking device 450 or connected to the electronic device 410 through a direct connection or an external Internet server. The external device 470 may not be a single device, but may be external devices, for example, the first external device 471 (for example, a display device), the second external device 472 (for example, a keyboard), the third external device 473 (for example, a mouse), and the fourth external device 474 (for example, a printer). Further, the external device 470 may be a speaker, a projector, a scanner, and a storage device. For example, when the external device 470 is a printer, the external device 470 may provide a print function for the electronic device 410.

An electronic device according to various embodiments may include a communication interface, a memory, and a processor. The processor may be configured to detect a connection between the electronic device and at least one external device or a docking device, to recognize context information of the electronic device based on an application being executed in the electronic device or a file being accessed, and to control operations of the electronic device and the at least one external device or the docking device based on the context information and the at least one external device.

The processor may be configured to detect a connection of another device connected to the external device.

The processor may be configured to identify a function of the at least one external device or another device connected to the external device.

The processor may be configured to select an operating system based on at least one of the context information of the electronic device and the external device and to activate the operating system.

The processor may be configured to identify an activation rule of the electronic device, to identify at least one external device, which may be connected to the electronic device, based on the activation rule, to activate the external device based on the activation rule, and to perform an operation corresponding to the activation rule based on the external device or the docking device.

The processor may be configured to update the activation rule based on a user or the context information of the electronic device.

The processor may be configured to identify the external device based on a priority assigned to the activation rule.

The context information may include at least one of an application being executed, contents being executed, measurement information of the sensor, the existence or non-existence of a connection of another device, a time, a date, and a connection scheme.

The processor may be configured to designate a data route output from the electronic device to the at least one external device.

According to various embodiments, the electronic device (for example, the docking device) may include a communication interface, a memory, and a processor. The processor may be configured to detect connection of another electronic device and the external device and to control the connection between the other electronic device and the external device.

The processor may be configured to identify a function of the external device and to transfer the identified function to the other electronic device.

The processor may be configured to update information on the external device according to whether the external device is connected and to transfer the information of the external device to the other electronic device.

Figure 5:
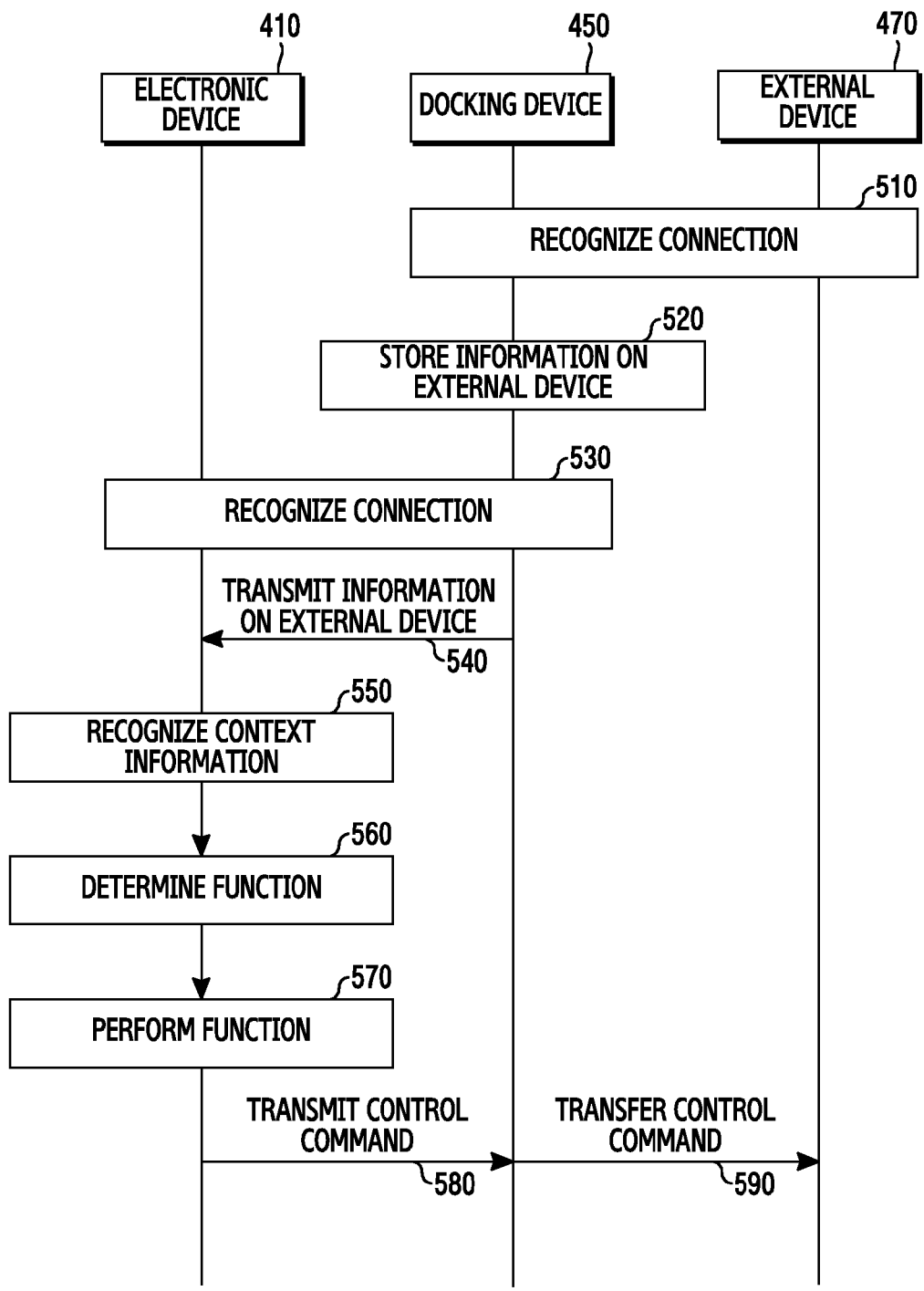
FIG. 5 is a flow diagram illustrating an order of operations between the electronic device, the docking device, and the external device according to various embodiments of the present disclosure.

FIG. 5 is a flow diagram illustrating an order of operations between the electronic device, the docking device, and the external device according to various embodiments of the present disclosure.

Referring to FIG. 5, the docking device 450 recognizes a connection with the external device 470 in operation 510. For example, the docking device 450 may be connected to at least one of the first external device 471 to the fourth external device 474. According to various embodiments, the docking device 450 and the external device 470 may be connected wirelessly or wired. In a wired connection scheme, the docking device 450 and the external device 470 may be connected through a cable or a contact terminal. For example, when the docking device 450 is connected to the external device 470 through a cable or detects the connection with the external device 470 at a contact terminal, the docking device 450 may recognize that the connection with the external device 470 is made.

A wireless connection scheme corresponds to a method of pairing the docking device 450 and the external device 470 by using a wireless protocol supported by the docking device 450 and the external device 470. For example, the docking device 450 may broadcast an acknowledge signal periodically or in real time, and receive a response signal from the external device 470 having received the acknowledge signal. The docking device 450 may transmit a request signal, which requests a connection with the docking device 450, to the external device 470 having transmitted the response signal, and receive a connection acceptance signal from the external device 470 having responded to the request signal, and thus may be wirelessly connected to the external device 470.

When the docking device 450 is connected to the external device 470, the docking device 450 may exchange information with the external device 470. First, the docking device 450 may make a request for information on the external device 470 to the external device 470 at the moment when the docking device 450 is connected to the external device 470. In response to the request, the external device 470 may transmit its own device information to the docking device 450.

In step 520, the docking device 450 stores the information on the external device 470 in the storage unit 452. The information on the external device 470 (hereinafter, referred to as "device information") may include at least one of a name, an identification (ID), a class, an additional function, and a history of the external device 470. The docking device 450 may store the device information in the storage unit 452 periodically or whenever the external device 470 is connected. The docking device 450 may identify whether the external device 470 is connected in real time or periodically, and update the device information according to whether the external device 470 is connected. For example, the docking device 450 may update the device information when a version of the external device 470 is updated. Alternatively, when the connection with the first external device 471 is released and the connection with the second external device 472 is made, the docking device 450 may delete the information of the first external device 471 from the storage unit 452 or store the release of the connection with the first external device 471, and store the information of the second external device 472 in the storage unit 452.

In step 530, the electronic device 410 recognizes the connection with the docking device 450. According to various embodiments, the electronic device 410 and the docking device 450 may be connected wirelessly or through a wire. In a wired connection scheme, the electronic device 410 and the docking device 450 may be connected through a cable or the docking device 450 may be connected to a contact terminal of the electronic device 410. A wireless connection scheme may be similar to the wireless communication scheme between the docking device 450 and the external device 470. Alternatively, when the electronic device 410 detects that the docking device 450 is located a short distance from the electronic device 410, the electronic device 410 may display a user interface, which inquires about whether the connection with the docking device 450 is made, on the electronic device 410 or the docking device 450. The electronic device 410 may receive a request for the connection with the docking device 450 from the user through the user interface and may be connected to the docking device 450.

According to various embodiments, the electronic device 410 may attempt to make the connection with the docking device 450 by using measurement information of the sensor (for example, the sensor module 240 or a motion recognition sensor). For example, when the electronic device 410 is used while being put on the docking device 450, measurement information of the sensor may be preset when the electronic device 410 is put on the docking device 450. When the preset measurement information is detected, the electronic device 410 may determine that the electronic device 410 is disposed on the docking device 450 and attempt to make the connection with the docking device 450. The electronic device 410 may transmit a connection request signal to the docking device 450 and receive a connection acceptance signal from the docking device 450 having responded to the connection request signal, and thus may be connected to the docking device 450.

According to various embodiments, the electronic device 410 may preset location information on a location which may be connected to the docking device 450 and, when the location on the currently acquired location information may be connected to the docking device 450, attempt to make the connection with the docking device 450. For example, the electronic device 410 may acquire location information by using the GNSS module 227 and, when it is determined that the electronic device 410 is located a close distance from the docking device 450, based on the location information, transmit a connection request signal to the docking device 450. When the docking device 450 having received the connection request signal accepts the connection, the electronic device 410 may be connected to the docking device 450.

According to various embodiments, the docking device 450 may be a device, which may be wirelessly charged. When the electronic device 410 starts wireless charging by using the docking device 450, the electronic device 410 may attempt to make the connection with the docking device 450. In addition, the electronic device 410 and the docking device 450 may be connected to each other through various connection methods.

In step 540, the docking device 450 transmits information on the external device 470 to the electronic device 410. When the docking device 450 is connected to the electronic device 410, the docking device 450 starts data exchange with the electronic device 410. According to some embodiments, when the electronic device 410 is connected to the docking device 450, the electronic device 410 may make a request for information on the external device 470, which is connected to the docking device 450, to the docking device 450. The docking device 450 may transmit device information stored in the storage unit 452 to the electronic device 410 according to the request.

In step 550, the electronic device 410 receives the device information and recognize context information of the electronic device 410. The context information indicates a state of the electronic device 410 and may include, for example, at least one of information on an application which is being executed in the foreground of the electronic device 410, information on whether there are no contents being executed, measurement information measured by a sensor of the electronic device 410, a current time, and a connection scheme.

Although FIG. 5 illustrates that step 540 is performed and then step 550 is performed, step 550 may be first performed and then step 540 may be performed. Further, step 540 and step 550 may be performed at the same time.

In step 560, the electronic device 410 determines a function based on the device information and the context information. The function may be an operation which may be performed by the electronic device 410 and may include, for example, reproduction of a video, printing, or document work.

In step 570, the electronic device 410 performs the determined function. The determined function may be one or more, and the electronic device 410 may automatically perform the function or perform one of the determined functions selected by the user.

In step 580, the electronic device 410 transmits a control command for performing the function to the docking device 450. In step 590, the docking device 450 transfers the control command received from the electronic device 410 to the external device 470. The docking device 450 may serve as a relay between the electronic device 410 and the external device 470. According to some embodiments, the electronic device 410 may be directly connected to the external device 470 without the docking device 450. In this case, the electronic device 410 may directly transmit the control command to the external device 470.

According to various embodiments, the electronic device 410 may determine executable functions based on device information and select at least one function from the determined functions based on context information. For example, when the electronic device 410 receives the device information in step 540, the electronic device 410 may determine the executable functions based on the device information. More specifically, when the device information indicates a display device, the electronic device 410 may determine a "video output function" as the executable function. When the device information indicates a speaker, the electronic device 410 may determine an "audio output function" as the executable function.

When the device information indicates a printer, the electronic device 410 may determine a "print function" as the executable function. When the device information indicates a keyboard and a mouse, the electronic device 410 may determine an "input function" as the executable function. In this case, the electronic device 410 selects at least one of the determined functions based on the context information in step 560. For example, when the context information indicates "video reproduction", the electronic device 410 may select the video output function and the audio output function based on the context information. When the context information indicates "document work", the electronic device 410 may select the print function and the input function based on the context information.

According to such an embodiment, the docking device 450 may be installed in a fixed location such as an office, home, and the like, and at least one external device 470 may be connected to the docking device 450. For example, when the electronic device 410 is connected to the docking device 450 in a state where the electronic device 410 executes nothing, the electronic device 410 may pre-determine executable functions based on the external device 470 connected to the docking device 450. Thereafter, when the electronic device 410 recognizes at least one piece of context information (for example, application execution, video reproduction, and the like), the electronic device 410 may select executable functions from the determined functions based on the recognized context information.

Figure 6:
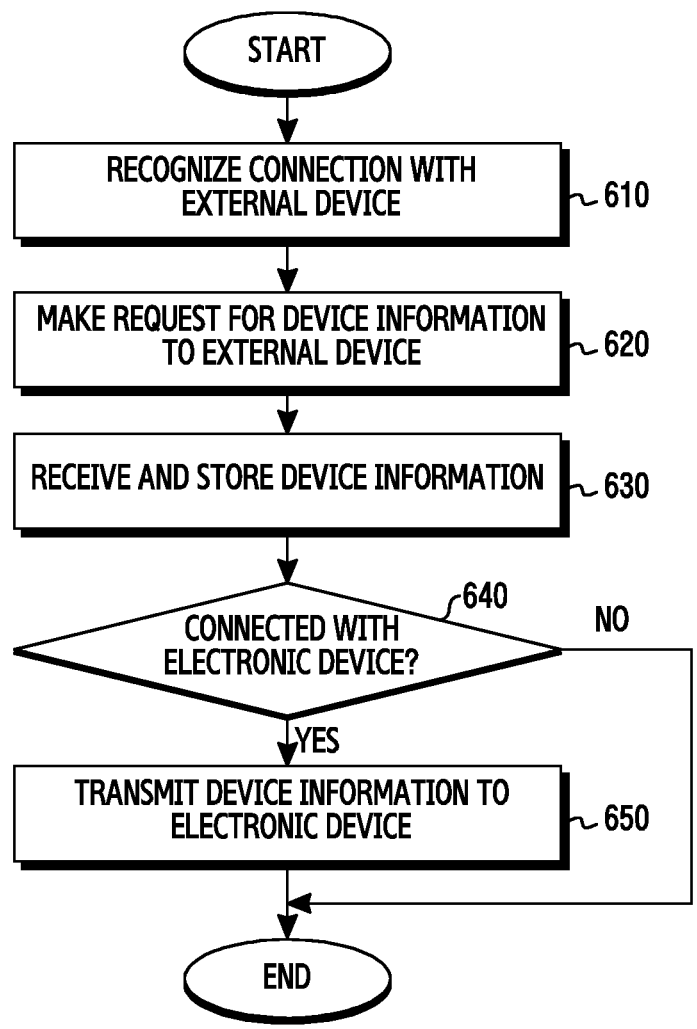
FIG. 6 is a flowchart illustrating an operation method of the docking device according to various embodiments of the present disclosure.

FIG. 6 is a flowchart illustrating an operation method of the docking device according to various embodiments of the present disclosure.

Referring to FIG. 6, the processor 453 recognizes a connection with the external device 470 in step 610. When the docking device is connected to the external device 470 through a cable or detects the connection with the external device 470 at a contact terminal, the processor 453 may recognize that the connection with the external device 470 is made. The processor 453 may wirelessly recognize the connection with the external device 470 by using a wireless protocol.

In step 620, the processor 453 makes a request for device information to the external device 470. The device information may include at least one of a name, an identification (ID), a class, an additional function, and a history of the external device 470. The processor 453 may make the request for the device information to the external device 470 periodically or whenever the external device 470 is connected.

For example, when a USB connection standard is used, the external device 470 may transfer its own class information.

TABLE 1

| Class | Descriptor Usage | Description |
|---|---|---|
| 00h | Device | Use class information in the interface descriptors |
| 01h | Interface | Audio |
| 02h | Both | Communications and CDC Control |
| 03h | Interface | HID (human interface device) |
| 05h | Interface | Physical |
| 06h | Interface | Image |
| 07h | Interface | Printer |

Table 1 shows class-specific functions of the external device 470. Referring to Table 1, the class information may indicate functions of the external device 470. It may be noted that the external device 470 of class "01h" corresponds to a speaker, which provides an "audio function" based on the description thereof, the external device 470 of class "06h" corresponds to a display device, which provides an "image" function, based on the description thereof, and the external device 470 of class "04h" corresponds to a printer, which provides a "printer" function based on the description thereof.

In addition to the USB standard, a standard including various discovery functions may be used. Further, between the docking device 450 and the external device 470, a process for exchanging predefined device information may be performed. The docking device 450 may store identified function information of the external device 470 in the storage unit 452 as the device information.

In step 630, the processor 453 receives the device information from the external device 470 and stores the received device information in the storage unit 452. According to various embodiments, the processor 453 may identify periodically, or in real time, whether the docking device is connected to the external device 470 and whether the information on the external device 470 is changed, and update the device information. For example, when the processor 453 exchanges information with the external device 470 and identifies that a version of the external device 470 is updated, the processor 453 may update the device information. Alternatively, when the connection with the first external device 471 is released and the connection with the second external device 472 is made, the processor 453 may delete the information of the first external device 471 from the storage unit 452 or store the release of the connection with the first external device 471, and store the information of the second external device 472 in the storage unit 452.

According to various embodiments, the processor 453 may determine an additional function of the external device 470 by analyzing the device information. When the external device 470 corresponds to a printer and it is determined that the external device 470 includes a display unit, the processor 453 may add a display function along with a print function to the information on the external device 470. Accordingly, when the user desires to reproduce a video through the external device 470, the electronic device 410 may determine a data (for example, audio, video, text, and the like) path for reproducing the video in consideration of the device information. In general, the video may be transferred to the display device and the audio data may be transferred to the speaker, but the electronic device 410 may transfer data related to the video to the printer including the display function based on the device information.

TABLE 2

| Name | ID | Class | Additional Functions | History |
|---|---|---|---|---|
| A | 0X1234 | 00h | Print | Y |
| B | 0X2345 | 0Eh | Image | N |
| C | 0X3456 | 10H | HID | Y |

Table 2 shows device information stored in the storage unit 452 of the docking device 450. Referring to Table 2, the docking device 450 may store at least one of a name, an identification (ID), a class, an additional function, and a history of the external device 470 as the device information. The device name may be designated in a predetermined type. For example, the device name may be determined using an index according to a connection order, or using a date or a class. The device ID indicates a unique ID value of the external device 470. Since each external device 470 may have its own unique ID, the device ID may be used to identify the corresponding external device. The class (or base class) may indicate a function of the external device 470 defined in the USB standard, and one or more classes may be stored.

The processor 453 may store additional functions by analyzing the device information or analyzing a user's operation pattern. Further, the processor 453 may store (a history) whether the external device 470 has been connected to the docking device 450. In the history, Y (Yes) indicates that the connection has been made and N (No) indicates that the connection has been never made. The processor 453 may identify whether the external device 470 is connected to the docking device 450 by checking the ID of the external device 470.

In step 640, the processor 453 determines that the docking device is connected to the electronic device 410. The processor 453 may determine whether the connection with the electronic device 410 is detected by the interface unit (for example, contact terminal) or whether the connection with the electronic device 410 is detected through a cable by the interface unit. Alternatively, when it is detected that the electronic device 410 is located near the docking device, the processor 453 may determine whether the connection with the electronic device 410 is made by transmitting/receiving a signal for the connection with the electronic device 410.

When the connection with the electronic device 410 is made, the processor 453 transmits the device information to the electronic device 410 in step 650. When the connection with the electronic device 410 is made, the processor 453 may receive a request for transmitting the device information from the electronic device 410. The processor 453 may transmit the device information to the electronic device 410 in response to the request.

Thereafter, the processor 453 may serve as a relay for data communication between the electronic device 410 and the external device 470. For example, the processor 453 may receive a control command from the electronic device 410 and transfer the received control command to the external device 470. That is, the processor 453 may help the electronic device 410 in performing the function by using the external device 470 due to its location therebetween.

According to various embodiments, the docking device 450 may serve as a relay for connecting the electronic device 410 and the external device 470. Alternatively, the docking device 450 may be included within the electronic device 410 and, in this case, the electronic device 410 may be directly connected to the external device 470. When the electronic device 410 and the external device 470 are directly connected to each other, the role of the processor 453 may be performed by the processor 413 of the electronic device 410.

Figure 7:
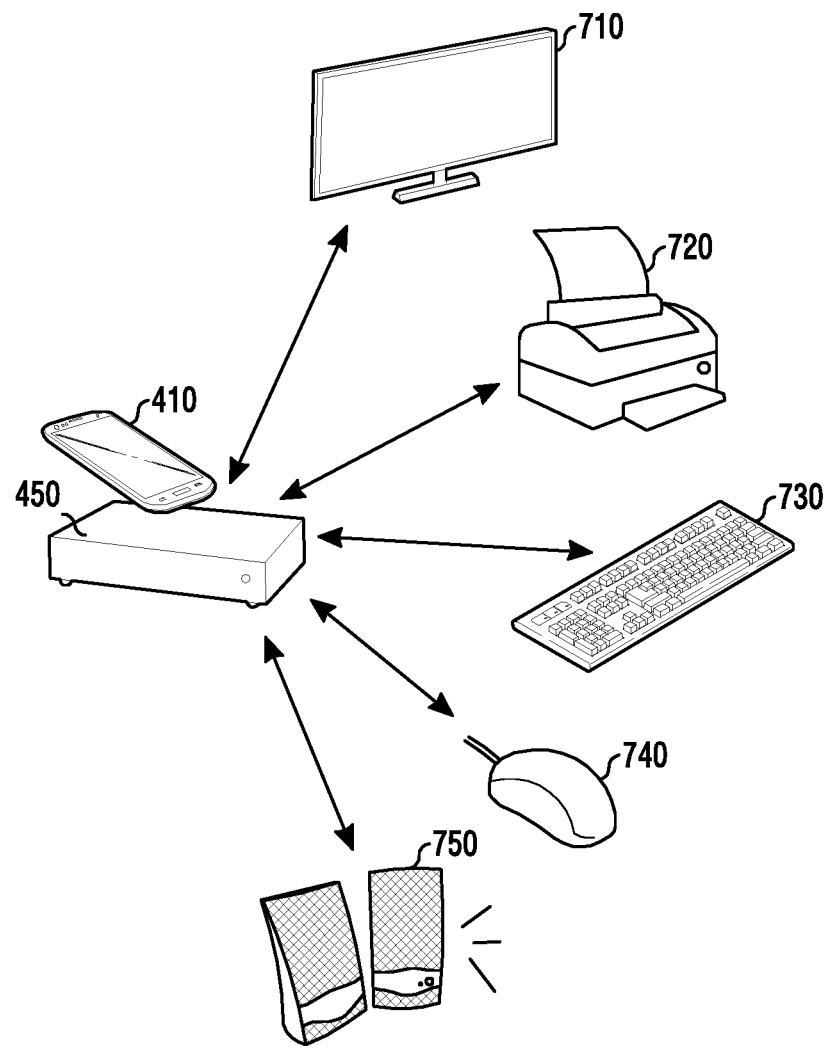
FIG. 7 illustrates an example of the external device connected to the docking device according to various embodiments of the present disclosure.

FIG. 7 illustrates an example of the external device connected to the docking device according to various embodiments of the present disclosure.

Referring to FIG. 7, the docking device 450 may be connected to one or more external devices 470. The external devices 470 include at least one of a display device 710, a printer 720, a keyboard 730, a mouse 740, and a speaker 750. The display device 710 may be a device that visually displays data processed by the electronic device 410 and may visually display various pieces of information such as images, videos, and user interfaces. The printer 720 is a device that prints data within the electronic device 410. The keyboard 730 and the mouse 740 may be devices that help in user input and may correspond to the input device 250 of the electronic device 201. The user may make an input into the electronic device 410 through the keyboard 730 and the mouse 740. The speaker 750 may output audio data of the electronic device 410.

In addition, the external device 470 may further include a charging device that supplies power to the electronic device 410, a microphone that receives an audio input, a projector that makes a display, and a scanner that scans for information within the electronic device 410. According to various embodiments, the external device 470 may include all devices, which may be used through a connection with the electronic device 410, as well as the above listed devices.

A plurality of external devices of the same type or different types, or at least some thereof, may be simultaneously connected to the docking device 450 depending on the situation. For example, two display devices, one keyboard, and one printer may be connected to the docking device 450, and one display device, one keyboard, one mouse, and one speaker may be connected to the docking device 450. The electronic device 410 may collectively determine the type of connected external device and context information of the electronic device 410, display a video on the display device 710, control the speaker 750 to output audio data, or provide a desktop use environment. The desktop use environment may provide a user experience (UX) to the user as if the user uses a desktop computer instead of actually using the electronic device 410 by controlling the keyboard 730 and the mouse 740 to receive a user input and the display device 710 to display.

Figure 8:
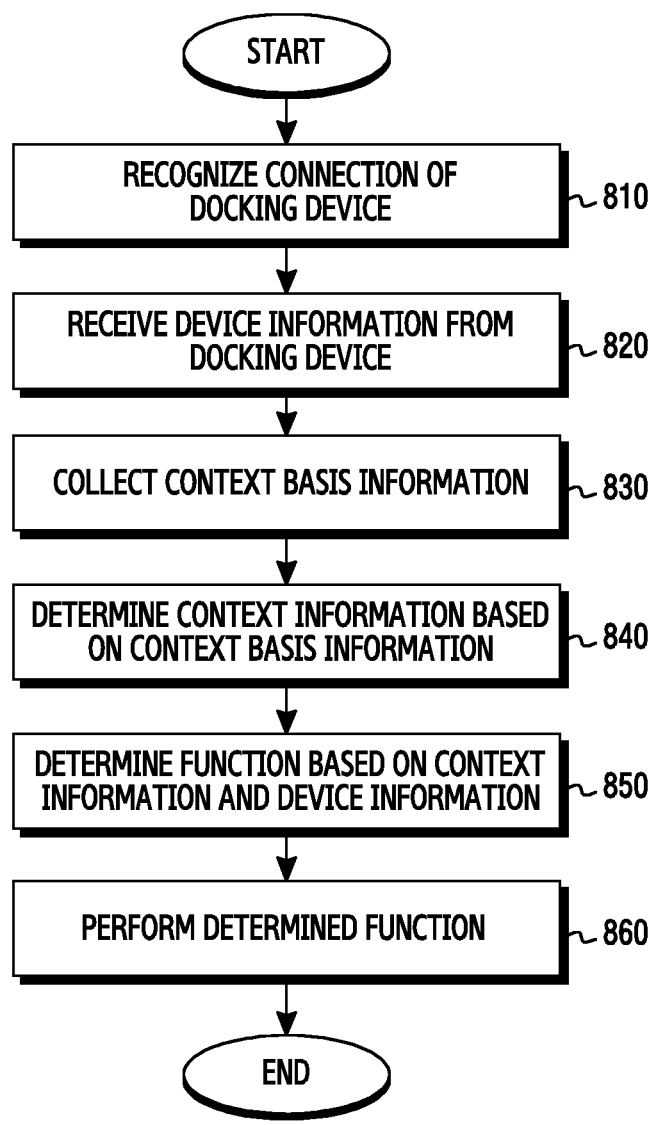
FIG. 8 is a flowchart illustrating an operation method of the electronic device according to various embodiments of the present disclosure.

FIG. 8 is a flowchart illustrating an operation method of the electronic device according to various embodiments of the present disclosure.

Referring to FIG. 8, the processor 413 recognizes a connection with the docking device 450 in step 810. When the connection with the docking device 450 is made through a cable or when the docking device 450 is connected to the contact terminal, the processor 413 may recognize that the connection with the docking device 450 is made. Alternatively, when it is detected that the docking device 450 is located near the electronic device, the processor 413 may recognize the connection with the docking device 450 by transmitting/receiving a signal for the connection with the docking device 450. For example, when the electronic device 410 is put on the docking device 450, the processor 413 may receive an acknowledge signal from the docking device 450 and transmit a response signal of the acknowledge signal, so as to make connection with the docking device 450. Alternatively, the processor 413 may transmit a connection request signal to the docking device 450 and receive a connection acceptance signal from the docking device 450 in response to the connection request signal, so as to make the connection with the docking device 450.

According to various embodiments, the processor 413 may automatically make the connection with the docking device 450. For example, the processor 413 may be automatically connected to the docking device 450 by using measurement information detected by a sensor (for example, the sensor module 240). When the measurement information is similar to, or the same as, preset measurement information, the processor 413 may determine that the electronic device 410 is placed on the docking device 450. In this case, the processor 413 may transmit the connection request signal to the docking device 450 and receive the connection acceptance signal from the docking device 450 in response to the connection request signal, so as to make the connection with the docking device 450.

According to various embodiments, location information on a location which may be connected to the electronic device 410 may be preset on the electronic device 410. The processor 413 may acquire location information in real time or periodically by using the GNSS module 227 and, when the acquired location information is similar to, or the same as, the preset location information, determine that the electronic device 410 is located a close distance from the docking device 450. In this case, the processor 413 may transmit the connection request signal to the docking device 450 and receive the connection acceptance signal from the docking device 450 in response to the connection request signal, so as to make the connection with the docking device 450.

The docking device 450 may be portable or fixed. When the docking device 450 is connected to the electronic device 410, a use environment, which is the same as that of the desktop computer, may be provided. That is, when the electronic device 410 is connected to the docking device 450, the electronic device 410 may be used like the desktop computer. Accordingly, a case where location information on the location which may be connected to the docking device 450 is preset on the electronic device 410 may be applied to an embodiment where the docking device 450 is fixed at home or office. For example, it may be assumed that location information of home corresponds to "Incheon" and location information of the office corresponds to "Seoul." When location information acquired using the GNSS module 227 corresponds to Incheon, the processor 413 may search for the docking device 450. At this time, the processor 413 may start searching for the docking device 450 in further consideration of a time and whether there is a signal received from the docking device 450 as well as the location information. The location information, the time, and whether the signal is received from the docking device 450 may be set by the user as a device search condition, or set by the processor 413 based on information accumulated in the electronic device 410 for a predetermined time.

The processor 413 may determine whether a current condition meets the device search condition and, when the condition is met, search for the docking device 450 and attempt to make the connection with the docking device 450. That is, the processor 413 may search for the docking device 450 in consideration of a time for which the user stays at home, a current location, and whether the signal of the docking device 450 is received based on information accumulated for a predetermined time. For example, when the user is at home from 12 a.m. to 7 a.m. and from 8 p.m. to 12 p.m. on weekdays, if the current location corresponds to Incheon and the current time corresponds to 8:30 p.m., the processor 413 may determine that the user is at home and search for the docking device 450. Alternatively, when the user is at the office from 8:30 a.m. to 7 p.m. on weekdays, if the current location corresponds to Seoul and the current time corresponds to 10 a.m., the processor 413 may determine that the user is at the office and search for the docking device 450.

According to various embodiments, when the docking device 450 is a device which may be wirelessly charged, the user may put on the electronic device 410 on the docking device 450 to wireless charge the electronic device 410. In this case, the processor 413 may start wireless charging through the docking device 450. When the wireless charging starts, the processor 413 may determine that the electronic device is located a close distance from the docking device 450. The processor 413 may transmit the connection request signal to the docking device 450 and receive the connection acceptance signal from the docking device 450 in response to the connection request signal, so as to make the connection with the docking device 450. Similar to the embodiment where the connection with the docking device 450 is attempted in consideration of the location, such an example may be applied to the case where the docking device 450 is fixed at home or office. In general, it is because the user charges the electronic device 410 while at home or office.

According to various embodiments, the processor 413 may ask the user about whether the connection with the docking device 450 is made and, when there is a user's request, make the connection with the docking device 450. For example, when the electronic device may be connected to the docking device 450, the processor 413 may display that the electronic device may be connected to the docking device 450 through a user interface. The user may "accept" or "reject" the connection with the docking device 450 while viewing the user interface. When the user accepts the connection, the processor 413 may connect the electronic device to the docking device 450. When the user accept the connection once, the processor 413 may automatically connect the electronic device to the docking device 450 later according to settings without the user's acknowledgement.

In step 820, the processor 413 receives device information from the docking device 450. When the connection with the docking device 450 is made, the processor 413 may make a request for device information of the external device 470 to the docking device 450 and receive the device information by the request. Alternatively, the processor 413 may receive the device information from the docking device 450 without any information request. The device information corresponds to information on the external device 470 connected to the docking device 450 and may include, for example, at least one of a name, an identification (ID), a class, an additional function, and a history of the external device 470.

In step 830, the processor 413 collects context basis information. Alternatively, the processor 413 may collect the context basis information through the context recognition unit 415. That is, the context recognition unit 415 may collect the context information and transfer the context information to the processor 413. According to various embodiments, the processor 413 may collect the context basis information at a time point corresponding to at least one of in real time, periodically, a predetermined time when the device information is received, and when the context basis information has changed.

The context basis information may be information required to recognize context information indicating the state of the electronic device 410. Accordingly, the context basis information may be similar to, or the same as, the context information. The context basis information may be information acquired by each element (for example, the processor or the sensor) of the electronic device 410. For example, the context basis information may include at least one of an application being executed, contents being executed, measurement information of the sensor, a connection with another device, a time, a date, and a connection scheme.

According to an embodiment, the application being executed may include at least one piece of information on an application executed in the foreground of the electronic device 410, information on an application executed in the background of the electronic device 410, and information on an application standing by in the background of the electronic device 410. The information on the application may include at least one of a name, an ID, a type, and an attribute of the application. The application executed in the foreground of the electronic device 410 may refer to an application currently displayed and executed by the electronic device 410 or executed by the processor 413. The application executed in the background of the electronic device 410 may refer to an application being executed, although not shown, on the screen such as music. For example, when the user surfs the web while listening to music, the processor 413 may execute a music application in the background while executing a search application for the web surfing in the foreground. The processor 413 or the context recognition unit 415 may check the type or attribute of the application to identify that the application is the application executed in the background of the electronic device 410.

The application standing by in the background of the electronic device 410 may refer to an application standing by in the background to be quickly executed although not currently displayed on the electronic device 410. For example, when the user plays a game and then surfs the web, a currently executed application may be a search application for the web surfing and a game application stands by in the background. While the music application is an application which may be executed in the background regardless of displaying on the screen, the search application and the game application may be not executed in the background. The processor 413 or the context recognition unit 415 may check the type or attribute of the application to identify that the application is the application standing by in the background of the electronic device 410.

The contents being executed may include information according to the content type or data type. For example, the content type or data type may include at least one of a text type, audio type, video type, and document type. In order to execute contents, an operation for executing an application corresponding to the contents to be executed may be preceded. For example, a music application may be executed to execute a music file and a video application may be executed to execute a video file, so that context basis information of the contents being executed may be included in information on the application being executed. However, information, which is not included in the application information, or specific matters may be included in the information on the contents being executed.

The measurement information of the sensor may be information measured by the sensor included within the electronic device 410. For example, the measurement information may include at least one of a location, movement path, motion, tilt, air pressure, acceleration, grip, proximity, biometric information, temperature, humidity, illumination, and infrared ray. The movement path may be acquired through a calculation of a location of the electronic device 410 varying depending on time. According to various embodiments, the electronic device 410 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M.

The existence of the connection with the other device may be information on the existence of connections with all other connectable devices other than the electronic device 410. For example, the processor 413 may collect, as context basis information, information on whether the electronic device is connected to other devices such as the docking device 450, the external device 470, another electronic device 102 or 104, the server 106, and a cloud.

The processor 413 may check a current time and identify whether there is a set time (for example, alarm). The processor 413 may check a current date and identify whether there is a predetermined date (for example, birthday or anniversary). The processor 413 may identify a connection scheme (wireless or wired) and a protocol defined in a wireless connection.

In step 840, the processor 413 determines context information based on the context basis information. According to various embodiments, the processor 413 may determine the context information based on at least one piece of context basis information or determine the context information in consideration of all the collected context basis information. For example, the processor 413 may determine the context information based on a currently executed application. Alternatively, the processor 413 may determine the context information in consideration of the currently executed application and a current location. For example, the processor 413 may identify when an application for displaying a current document is executed or a type of contents being executed and determine context information corresponding to "document work." Alternatively, the processor 413 may determine context information in further consideration of user's settings. A plurality of pieces of context information may be determined, and the context information may be generated, modified, and deleted by the user.

Although FIG. 8 illustrates that step 820 is performed before steps 830 and 840 are performed, steps 830 and 840 may be first performed and then step 820 may be performed. Further, step 820 and steps 830 and 840 may be performed at the same time. The order of the operations is not limited by the disclosure.

In step 850, the processor 413 determines functions based on the context information and the device information. For example, the processor 413 may determine functions of music reproduction, video display or reproduction, document work, desktop, print, scan, and game play in consideration of the currently executed application and the external device 470. The number of determined functions may be singular or plural. When the number of determined functions is plural, the processor 413 may execute at least one or a plurality of functions according to a user input.

According to various embodiments, the processor 413 may set an activation rule and store the set activation rule in the storage unit 412. The processor 413 may determine the functions according to the activation rule. Based on the activation rule, when the context information corresponds to music reproduction, the electronic device should be connected to the external device, which is a speaker, and, when the speaker is connected, a music reproduction function is determined. That is, the processor 413 may identify the external device 470 based on the activation rule, activate the external device 470, and determine a function that matches the activation rule. The activation rule may be preset on the electronic device 410, automatically set by the processor 413, or set by the user.

According to an embodiment, when the activation rule is automatically set, the processor 413 may analyze a user's behavior pattern and generate the activation rule based on the user's behavior pattern. For example, when the user changes the external device, which is executed under the activation rule generated based on the user's behavior pattern, to another external device, the processor 413 may automatically change the activation rule based on the execution of the other external device. For example, when music is played in the electronic device 410, the activation rule may perform an operation for making a connection with an "external speaker". However, when the user consistently terminates the external speaker and makes an earphone connection, the processor 413 may modify the activation rule corresponding to the connection with the external speaker and automatically output the music to the earphones if the music is played in the electronic device 410.

According to various embodiments, the processor 413 may set the activation rule for performing basic functions. Although not illustrated, the electronic device 410 may further include a rule setting module for setting the activation rule. The rule setting module may be provided to the electronic device 410 in the form of application or program. Accordingly, the user may set, add, change, and delete rules through the application or program since every user desires a different function. Alternatively, the rule setting module may operate while being included in the processor 413. The user may generate context information and generate a condition for determining the context information. For example, the user may set the video reproduction to be determined as the context information only when a particular file is executed. Alternatively, the user may set the video reproduction to be determined as the context information only under a condition where a video reproduction application is executed. Alternatively, the user may set, add, or change a data output path, through which the data is transferred to the external device, according to the context information.

According to an embodiment, the generated activation rule may be shared with another user through wireless communication or wired communication. For example, the activation rule generated by the user may be shared with another user by registering the activation rule in the server or through an email or SNS. The shared activation rule may be downloaded or executed by another electronic device and the external device may be controlled based on the activation rule.

According to various embodiments, the processor 413 may assign a priority to the activation rule. When the processor 413 cannot determine a function corresponding to the activation rule having a high priority, the processor 413 may determine a function corresponding to the activation rule having a low priority. For example, the video reproducing function may be determined only when both the speaker and the display device are connected, but a function related to the video reproduction may be provided even when only one of the speaker and the display device is connected. The processor 413 may assign a first priority to the activation rule in a case where both the speaker and the display device are connected, assign a second priority to the activation rule in a case where only the speaker is connected, and assign a third priority to the activation rule in a case where only the display device is connected. In this case, the processor 413 may determine the "video reproducing function" for the activation rule corresponding to the first priority, determine the "audio output function" for the activation rule corresponding to the second priority, and determine the "video output function" for the activation rule corresponding to the third priority.

Alternatively, the processor 413 may assign the first priority to the activation rule in the case where both the speaker and the display device are connected, assign the second priority to the activation rule in the case where only the display device is connected, and to assign the third priority to the activation rule in the case where only the speaker is connected. In this case, the processor 413 may determine the "video reproducing function" for the activation rule corresponding to the first priority, determine the "video output function" for the activation rule corresponding to the second priority, and determine the "audio output function" for the activation rule corresponding to the third priority.

According to various embodiments, when the processor 413 cannot determine a function that matches a predetermined activation rule, the processor 413 may not perform any operation.

TABLE 3

| Context information | Device information | Function |
|---|---|---|
| Play music in foreground | Speaker | Play music |
| Another app stands by while music is played in foreground or background | Speaker, display device | |
| | Speaker, display device, keyboard, mouse, or printer or scanner | Play music Wait for os switching |
| Measurement information and date correspond to preset condition while music is played in foreground or background | Speaker | Play music Wireless charging |
| | Speaker, display device | Play music Wireless charging Construct tv environment |
| | Speaker, display device, keyboard, mouse or printer or scanner | Play music Wireless charging Wait for os switching |
| Execute document app in foreground while music is played in foreground or background | Speaker, display device, keyboard, mouse | Play music Document work |
| | Speaker, display device, keyboard, mouse, printer | Play music Document work Print |
| | Speaker, display device, keyboard, mouse, scanner | Play music Document work scan |
| | Speaker, display device, keyboard, mouse, printer, scanner | Play music Document work Print Scan |
| Execute document app in foreground Another app stands by in background while document app is executed in foreground | Keyboard, mouse | Document work |
| | Keyboard, mouse, display device, or speaker | Document work (desktop environment) |
| | Keyboard, mouse, display device, speaker, printer | Document work print |
| | Keyboard, mouse, display device, speaker, scanner | Document work Scan |
| | Keyboard, mouse, display device, speaker, printer, scanner | Document work Print Scan |

TABLE 3-continued

| Context information | Device information | Function |
|---|---|---|
| Execute video in foreground Another app stands by in background while video is executed in foreground | Speaker | Output audio |
| | Display device or beam projector | Output video |
| | Speaker, display device, or beam projector | Reproduce video |
| Execute game in foreground Another app stands by in background while game is executed in foreground | Speaker | Output audio |
| | Display device or beam projector | Output video |
| | Speaker, display device, or beam projector | Play game |

Table 3 lists functions which may be performed according to context information and device information. Referring to Table 3, the processor 413 determines a music play function when the speaker is connected as the external device 470 while the music application is executed in the foreground or background. Alternatively, in a state where another application stands by in the background while the music application is executed in the foreground or background, when the display device, the keyboard, and the mouse are connected as the external device 470 as well as the speaker, the processor 413 may determine the music play function and the OS switching waiting function. The OS switching waiting function may refer to a state where the operation system of the electronic device 410 may be changed to the operating system of the desktop computer in order to provide an environment similar to that of the desktop computer. In this case, when the electronic device 410 is connected to the docking device 450 without a separate user input, the processor 413 may automatically construct an environment similar to that of the computer and thus improve the user's convenience.

According to various embodiments, if the electronic device 410 is in a silent mode when audio data is output to the external device 470, the processor 413 may automatically release the silent mode. Alternatively, the processor 413 may ask the user about whether to end the silent mode and, when there is a user's request, ends the silent mode.

According to various embodiments, when measurement information and the date and time correspond to a preset condition while the music application is executed in the foreground or background, the processor 413 may provide various functions according to the type of connected external device 470. The preset condition refers to determining that the measurement information and the date and time indicate that the user is at home or office. In this case, when the electronic device 410 is connected to the docking device 450, the processor 413 may perform wireless charging by using the docking device 450. For example, when the electronic device 410 is connected only to the speaker corresponding to the electronic device 470, the processor 413 may determine the music playing function and the wireless charging function. When the electronic device 410 is connected to the speaker and the display device as the external devices 470, the processor 413 may determine the music playing function, the wireless charging function, and the TV function. The TV function may mean to output a video of the electronic device 410 to the display device corresponding to the external device 470 and to output audio of the electronic device 410 to the speaker which is the external device 470. In this case, when the electronic device 410 is connected to the docking device 450 without a separate user's input, the processor 413 may automatically construct the above described TV environment and thus improve the user's convenience. When the electronic device 410 is connected to the keyboard and the mouse as the external devices 470 as well as the speaker and the display device, the processor 413 may determine the music playing function, the wireless charging function, and the OS switching waiting function.

According to various embodiments, when the document application is executed in the foreground while music is executed in the foreground or background, if the electronic device 410 is connected to the speaker, the display device, the keyboard, and the mouse as the external devices 470, the processor 413 may determine the music playing function and the document work function. The document application may collectively refer to applications which may record and display information by using text or images. For example, the document application may be an application which may display documents such as Hangul, note (note pad), Word, Excel, PowerPoint, and portable document format (PDF). The document work function may mean to provide a function for recording and displaying the above documents. For example, the document work function may mean to construct an environment similar to that of the computer.

Further, when the printer is connected as the external device 470, the processor 413 may determine the music playing function, the document work function, and the print function. In addition, when the scanner is further connected as the external device 470, the processor 413 may determine the music playing function, the document work function, the print function, and the scan function. At this time, when measurement information and the date and time correspond to the preset condition, the processor 413 may provide the wireless charging function by using the docking device 450.

According to various embodiments, when the document application is executed in the foreground or another application stands by in the background while the document application is executed in the foreground, if the keyboard and the mouse are connected as the external devices 470, the processor 413 may determine the document work function. Even when the display device or the speaker is further connected as the external device 470, the processor 413 may determine the document work function. When the printer is further connected as the external device 470, the processor 413 may determine the document work function and the print function. When the scanner is further connected as the external device 470, the processor 413 may determine the document work function, the print function, and the scan function. When measurement information and the date and time correspond to the preset condition, the processor 413 may provide the wireless charging function by using the docking device 450.

According to various embodiments, when the video application is executed in the foreground or another application stands by in the background while the video application is executed in the foreground, if only the speaker is connected as the external devices 470, the processor 413 may determine the audio output function. The audio output function may output the audio to the speaker. Alternatively, when only the display device is connected as the external device 470, the processor 413 may determine the video output function. The video output function may output a video to the display device. When the speaker and the display device (or beam projector) are connected as the external devices 470, the processor 413 may determine the video reproducing function. The video reproducing function may output a video to the display device which is the external device 470 and output audio of the video to the speaker which is the external device 470. At this time, when measurement information and the date and time correspond to the preset condition, the processor 413 may provide the wireless charging function by using the docking device 450.

According to various embodiments, when the game application is executed in the foreground or another application stands by in the background while the game application is executed in the foreground, if the electronic device 410 is connected only to the speaker as the external devices 470, the processor 413 may determine the audio output function. The audio output function may output the audio to the speaker. Alternatively, when the electronic device 410 is connected only to the display device as the external device 470, the processor 413 may determine the video output function. The video output function may output the video to the display device. When the electronic device 410 is connected to the speaker and the display device (or beam projector) as the external devices 470, the processor 413 may determine the video reproducing function. The video reproducing function may output a video to the display device which is the external device 470 and output audio of the video to the speaker which is the external device 470. When measurement information and the date and time correspond to the preset condition, the processor 413 may provide the wireless charging function by using the docking device 450.

In step 860, the processor 413 performs the determined functions. For example, when the "music playing function" is determined, the processor 413 may make a control to output music-related audio data through the "speaker" which is the external device 470. For example, the processor 413 may transfer the audio data to the speaker through the docking device 450 or directly. Alternatively, when the "video reproducing function" is determined, the processor 413 may transfer video-related audio data to the "speaker" and transfer video-related video data to the "display device," thereby performing a function of displaying the video reproduced through the external device 470.

FIGS. 9A to 9D illustrate examples of external devices used by the electronic device according to various embodiments of the present disclosure.

Figure 9A:
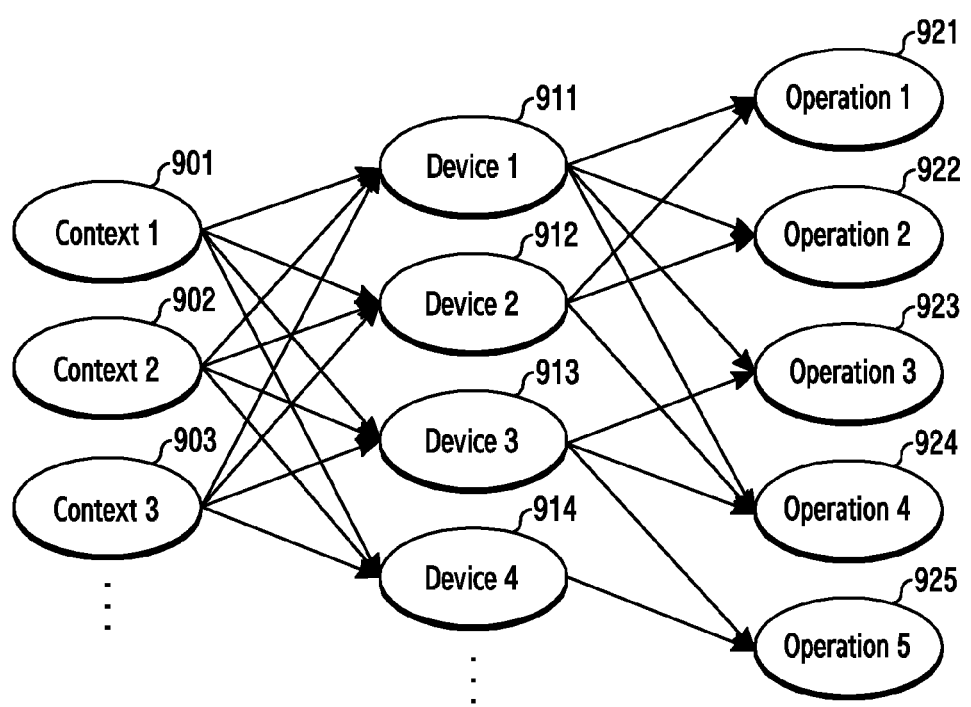
FIG. 9A illustrates an example of external devices used by the electronic device according to various embodiments of the present disclosure.

FIG. 9A illustrates an example for determining an operation (or function) based on context information and device information. For example, when external device #1 911 is connected with respect to context #1 901, the processor 413 may determine operation #1 921, operation #2 922, operation #3 923, and operation #4 924. When external device #2 912 is connected with respect to context #1 901, the processor 413 may determine operation #1 921, operation #2 922, and operation #4 924. When external device #3 913 is connected with respect to context #1 901, the processor 413 may determine operation #3 923, operation #4 924, and operation #5 925. When external device #4 914 is connected with respect to context #1 901, the processor 413 may determine operation #5 925. Similarly, the processor 413 may determine at least one of operation #1 921, operation #2 922, operation #3 923, operation #4 924, and operation #5 925 according to the external device connected with respect to the context #2 902 or context #3 903.

Figure 9B:
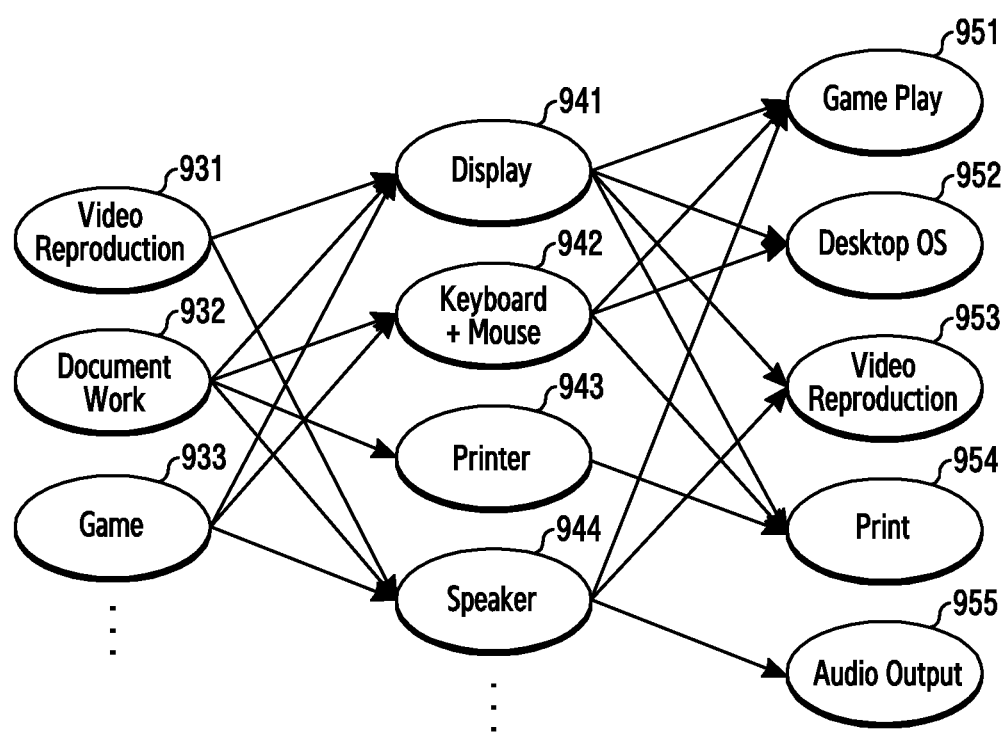
FIG. 9B illustrates another example of external devices used by the electronic device according to various embodiments of the present disclosure.

FIG. 9B illustrates various functions determined based on context information and device information. For example, when a video is reproduced in the electronic device 410, the processor 413 may define context information as video reproduction 931. In this case, the processor 413 may determine whether a display 941 or a speaker 944 is connected as the external device. When the display device 941 is connected, the processor 413 may determine a video reproducing function 953. When a speaker 944 is connected, the processor 413 may determine an audio output function 955.

For example, when a document (for example, Word or PowerPoint) is opened in the electronic device 410, the processor 413 may define context information as document work 932. In this case, the processor 413 may determine whether the display 941, a keyboard and mouse 942, and a printer 943 are connected as the external devices. When the display device 941 and the keyboard and mouse 942 are connected, the processor 413 may determine a desktop OS function 952. When a printer 943 is further connected, the processor 413 may determine a print function 954.

For example, when a game is played in the electronic device 410, the processor 413 may define context information as a game 933. In this case, the processor 413 may determine whether the display 941, the keyboard and mouse 942, and the speaker 944 are connected as the external devices. When the display device 941, the keyboard and mouse 942, and the speaker 944 are connected, the processor 413 may determine a game playing function 951.

Figure 9C:
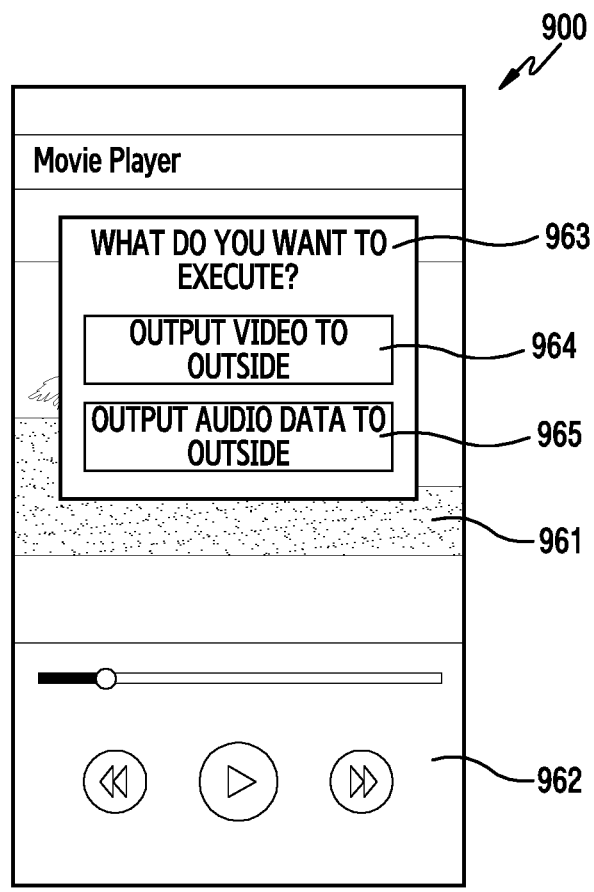
FIG. 9C illustrates another example of external devices used by the electronic device according to various embodiments of the present disclosure.

FIG. 9C illustrates a user interface for determining a function. Referring to FIG. 9C, when the number of determined functions is one or more, the processor 413 may display a user interface 900 for determining the functions. For example, the processor 413 may display a popup message 963 while displaying a video screen 961 and a control menu 962 for controlling a video. The popup message 963 may ask the user about a function which the user desires to execute between a function 964 of outputting the video to the outside and a function 965 of outputting audio data to the outside. The processor 413 may perform the function selected by the user from the popup message 963. According to an embodiment, the user may select one of the function 964 of outputting the video to the outside and the function 965 of outputting the audio data to the outside or select both functions. The processor 413 may perform one of the function 964 of outputting the video to the outside and the function 965 of outputting the audio data to the outside or perform both functions.

Figure 9D:
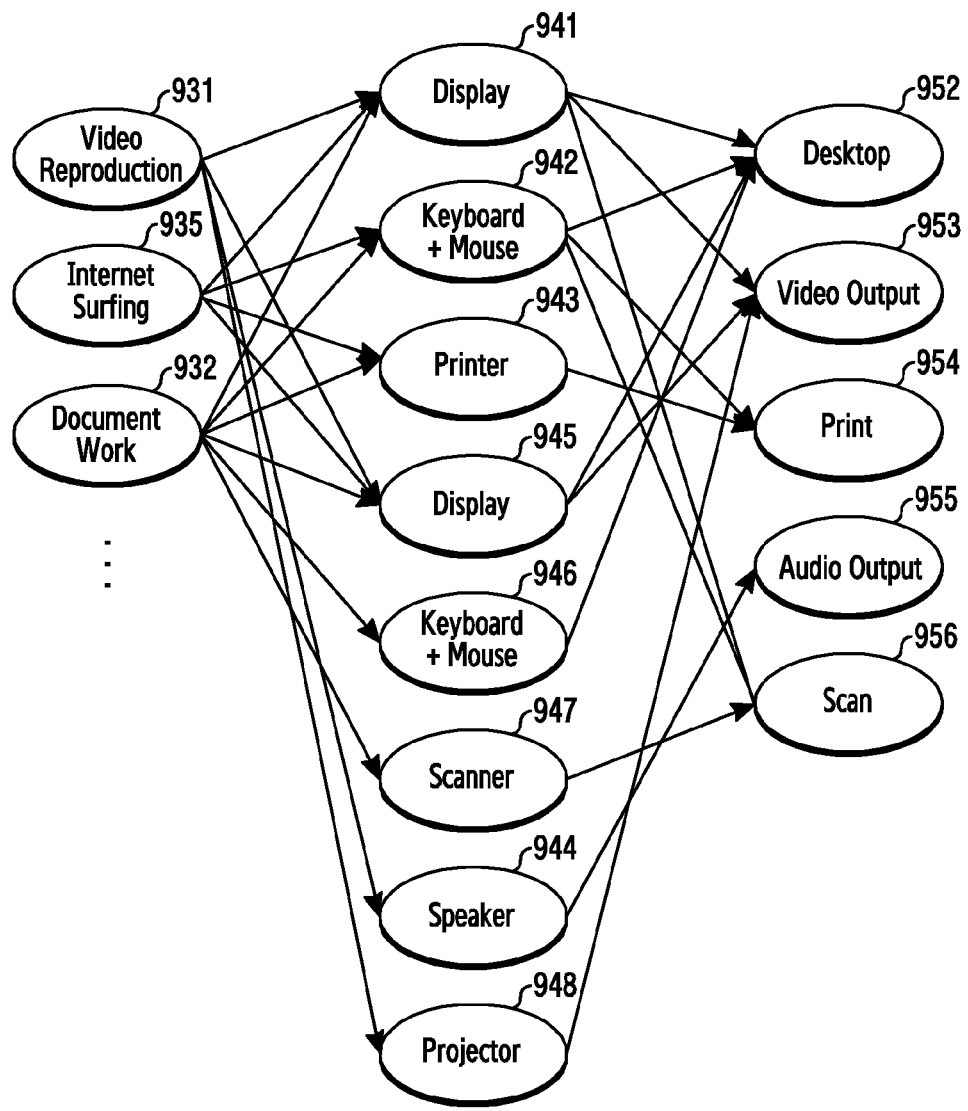
FIG. 9D illustrates another example of external devices used by the electronic device according to various embodiments of the present disclosure.

FIG. 9D illustrates an example for determining functions when a plurality of external devices of the same type or different types are connected. FIG. 9D illustrates an example of the activation rule and does not limit the present disclosure.

Referring to FIG. 9D, the processor 413 may recognize, as context information, video reproduction 931, Internet surfing 935, and document work 932 based on context basis information. In the video reproduction 931, the processor 413 may determine whether the display device 941 and the speaker 944 are connected. At this time, the processor 413 may further recognize the display device 945 or the projector 948 as well as the display device 941 and the speaker 944. When a plurality of external devices 470 of the same type (for example, display, audio output, and print) are connected, the processor 413 may determine information to be transmitted to each external device 470. The processor 413 may determine a priority based on a class or type of the external device 470 and selectively use at least one display device according to the priority.

For example, when two display devices are connected, the processor 413 may transfer the same video data to the two display device simultaneously or with a time difference, or transfer different video data to the two display devices simultaneously or with a time difference. Alternatively, the processor 413 may use the two display devices or selectively use at least one display device based on the type of video data displayed on the electronic device 410. At this time, the display device 413 may select at least one display device based on the class or type of the external device 470.

When there are a number of connected external devices, the processor 413 may determine various functions according to a combination of the external devices. In the document work 932, the processor 413 may further recognize another display device 945, another keyboard and mouse 946, and a scanner 947 as well as the display device 941 and the keyboard and mouse 942. The processor 413 may determine the desktop function 952, the video output function 953, the print function 954, the audio output function 955, or the scan function 956 according to the connected external device. The video output function 953 may be a video reproducing (or outputting) function.

Figure 10:
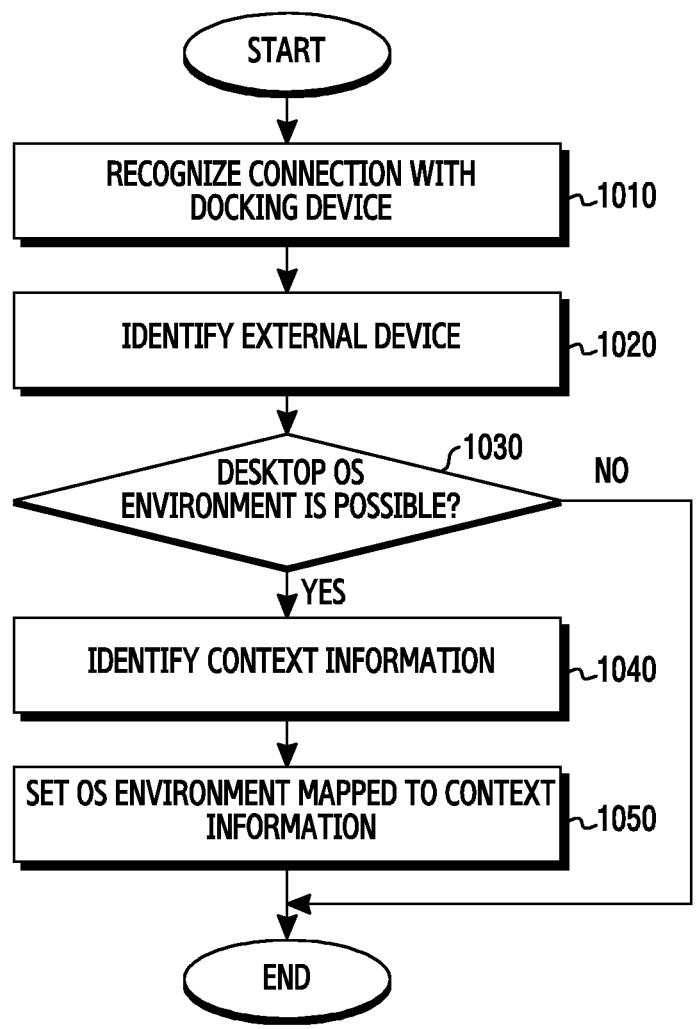
FIG. 10 is a flowchart illustrating a method of switching an operating system based on an external device by the electronic device according to various embodiments of the present disclosure.

FIG. 10 is a flowchart illustrating a method of switching an operating system based on an external device by the electronic device according to various embodiments of the present disclosure.

Referring to FIG. 10, the processor 413 recognizes a connection with the docking device 450 in step 1010. Since the recognition of the connection with the docking device 450 is similar to step 810 of FIG. 8, which has been described above, a detailed description thereof will be omitted.

In step 1020, the processor 413 identifies the external device 470. The identification of the external device 470 corresponds to step 820 of FIG. 8, which has been described above, and the processor 413 may receive device information from the docking device 450 and identify the external device 470 connected to the docking device 450.

In step 1030, the processor 413 determines whether a desktop OS environment may be used based in the connected external device 470. The desktop OS environment refers to an environment similar to that of the desktop computer. For example, in order to use the desktop OS environment, a keyboard, a mouse, and a display device should be connected as the external devices 470. Accordingly, the processor 413 may identify whether the keyboard, the mouse, and the display device are connected as the external device 470. Further, a printer, a scanner, and a speaker may be connected as the external device 470.

According to various embodiments, when the desktop OS environment cannot be used, the processor 413 may terminate the operation. At this time, the processor 413 terminates only the operation related to construction of the desktop OS environment, and may perform step 830 to step 860 described in FIG. 8.

When the desktop OS environment may be used, the processor 413 identifies context information in step 1040. The processor 413 may recognize the context information by performing step 830 to step 840 of FIG. 8 which have been described above.

In step 1050, the processor 413 sets an OS environment mapped to the context information. According to various embodiments, the processor 413 may preset the context information-specific OS environment. The context information-specific OS environment may be preset by the user or preset on the electronic device 410. The context information-specific OS environment may be stored in the storage unit 412. According to various embodiments, the processor 413 may determine which OS environment is more preferred according to the context information and set the determined OS environment. For example, the processor 413 may determine which OS environment is the best to provide the context information.

TABLE 4

| Context | OS |
| --- | --- |
| Internet | Desktop |
| Video | Mobile |
| Document | Desktop |

Table 4 shows an example in which context information-specific OS environments are set. Referring to Table 4, the user may prefer making the OS environment be a desktop environment when the Internet is used. Accordingly, when the context information corresponds to "Internet", the user may set the OS environment as a desktop OS. Similarly, in the playing of video, the user may be satisfied with the use of a mirroring function alone before the docking device 450 is connected, so that the user may set the OS environment as a mobile OS if the context information corresponds to "video".

According to various embodiments, the processor 413 may determine an OS, which may be currently used, according to a configuration of the external device. For example, when only the display device is currently connected as the external device 470, it is difficult to construct a user environment using the desktop OS. Accordingly, when only the display device is connected as the external device 470, the processor 413 may set the environment using the mobile OS and thus allow the user to use the electronic device only as the electronic device 410. Accordingly, the processor 413 may identify an OS which may be supported according to the configuration of the external device 470 when the external device 470 is connected to the docking device 450.

According to various embodiments, when setting the OS environment, the processor 413 may switch the OS environment to not hinder the user from using the electronic device 410. That is, the processor 413 may switch the OS environment to a seamless OS environment to prevent stopping use of the device by the user. When the mobile OS environment switches to the desktop OS environment, the processor 413 may transfer information required for the OS switching through communication between the OSs. Alternatively, the processor 413 may prepare the required OS environment in advance.

TABLE 5

| Context | OS | Field 1 | Field 2 | Field 3 |
| --- | --- | --- | --- | --- |
| Internet | Desktop | IE9 | www.samsung.com | — |
| Video | Mobile | Mirroring | — | — |
| Editing Excel | Desktop | Excel | Menu.xlx | (3, 18) |

Table 5 shows an example of required information according to OS switching. Referring to FIG. 5, when an OS that matches context information and device information corresponds to a desktop, the processor 413 may switch the OS to the desktop OS. At this time, information on an application to be executed in the switched OS may be designated to field 1 and information request for the executed application, for example, an Internet address and an execution file name may be designated to field 2. Accordingly, when the OS switching is needed, the processor 413 may configure the state before the docking device 450 is connected to be as similar as possible to the switched OS environment by using corresponding field information. In a case where it is set not to switch the OS, the processor 413 may designate an additional field when determining a function according to context information.

An operation method of an electronic device according to various embodiments may include detecting a connection between the electronic device and at least one external device, an operation of recognizing context information of the electronic device based on an application being executed in the electronic device or a file being accessed, and an operation of controlling operations of the electronic device and the at least one external device based on the context information and the at least one external device.

The operation of detecting the connection may include an operation of detecting a connection of another device connected to the external device.

The operation of detecting the connection may include an operation of identifying a function of the at least one external device or another device connected to the external device.

The operation of controlling the operations may include an operation of selecting an operating system based on the context information of the electronic device or the at least one external device and an operation of activating the operating system.

The operation of controlling the operations may include an operation of identifying an activation rule of the electronic device, identifying at least one external device, which may be connected to the electronic device, based on the activation rule, an operation of activating the external device based on the activation rule, and operation of performing an operation corresponding to the activation rule based on the external device.

The operation of identifying the activation rule may include an operation of updating the activation rule based on a user or the context information of the electronic device.

The operation of identifying the external device may include an operation of identifying the external device based on a priority assigned to the activation rule.

The operation of recognizing the context information may include an operation of recognizing, as the context information, at least one of an application being executed, contents being executed, measurement information of a sensor, whether another device is connected, a time, a date, and a connection scheme.

The operation of controlling the operations may include an operation of designating a data route output from the electronic device to the at least one external device. According to various embodiments, it is possible to improve the user's convenience by simply connecting an electronic device to one or more external devices and providing various functions through the external devices.

According to various embodiments, by connecting one or more external devices to a docking device and then connecting the docking device to an electronic device, the external device and the electronic device may be conveniently connected through the docking device.

According to various embodiments, it is possible to provide various functions which the user desires as well as a function preset on the external device by providing various functions by using external devices connected to the electronic device based on context information of the electronic device.

The computer readable recording medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high level language codes, which may be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided to describe technical details of the present disclosure and to help the understanding of the present disclosure, and do not limit the scope of the present disclosure. Accordingly, the scope of the present disclosure should be construed as including all modifications or various other embodiments based on the technical idea of the present disclosure.

While the present disclosure has been shown and described with reference to certain embodiments, it will be understood by those skilled in the art that various changes in form and details may be made therein without departing from the spirit and scope of the present disclosure as defined by the appended claims and their equivalents.

What is claimed is:

1. An electronic device comprising:
a communication interface;
a memory; and
a processor, wherein the processor is configured to:
detect a connection with a docking device;
receive device information corresponding to at least one external device connected to the docking device, from the docking device;
identify a function of the at least one external device using the device information;
recognize context information of the electronic device based on an application being currently executed in the electronic device;
determine at least one function based on the identified function and the context information; and
perform the determined function to transmit data associated with the determined function to the at least one external device via the docking device.

2. The electronic device of claim 1, wherein the processor is further configured to select and activate an operating system based on at least one of the context information of the electronic device or the external device.

3. The electronic device of claim 1, wherein the processor is further configured to:
identify an activation rule of the electronic device;
identify at least one external device based on the activation rule;
activate the external device based on the activation rule; and
perform an operation corresponding to the activation rule based on the external device or the docking device.

4. The electronic device of claim 3, wherein the processor is further configured to update the activation rule based on a user or the context information of the electronic device.

5. The electronic device of claim 3, wherein the processor is further configured to identify the external device based on a priority assigned to the activation rule.

6. A docking device comprising:
a communication interface;
a memory; and
a processor, wherein the processor is configured to:
recognize a connection with at least one external device;
receive device information from the at least one external device;
store the device information in the memory;
detect whether a connection between the docking device and an electronic device is obtained;
transmit the device information in the memory to the electronic device if the connection between the docking device and the electronic device is detected;
control a connection between the electronic device and the at least one external device;
identify a function of the external device; and
transfer the identified function to the electronic device.

7. The docking device of claim 6, wherein the processor is further configured to:
update device information on the external device according to whether the external device is connected; and
transfer the updated device information to the electronic device.

8. A method of operating an electronic device, the method comprising:
detecting a connection between the electronic device and a docking device;
receiving device information corresponding to at least one external device connected to the docking device, from the docking device;
identify a function of the at least one external device using the device information;
recognizing context information of the electronic device based on an application being currently executed in the electronic device;
determining at least one function based on the identified function and the context information; and
performing the determined function to transmit data associated with the determined function to the at least one external device via the docking device.

9. The method of claim 8, wherein controlling the operations comprises:
selecting an operating system based on the context information of the electronic device or the at least one external device; and
activating the operating system.

10. The method of claim 8, wherein controlling the operations comprises:
identifying an activation rule of the electronic device;
identifying at least one external device based on the activation rule;
activating the external device based on the activation rule; and
performing an operation corresponding to the activation rule based on the external device.

11. The method of claim 10, wherein identifying the activation rule comprises updating the activation rule based on a user or the context information of the electronic device.

12. The method of claim 10, wherein identifying the external device comprises identifying the external device based on a priority assigned to the activation rule.

13. The method of claim 8, wherein the context information comprises at least one of an application being executed, content being executed, measurement information of a sensor, whether another device is connected, a time, a date, and a connection scheme.

* * * * *